(12) United States Patent
Kimura (10) Patent No.: US 12,257,668 B2
(45) Date of Patent: Mar. 25, 2025

(54) SUPPORT DEVICE

(71) Applicant: FANUC CORPORATION, Yamanashi (JP)

(72) Inventor: Atsushi Kimura, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 262 days.

(21) Appl. No.: 17/910,850

(22) PCT Filed: Mar. 15, 2021

(86) PCT No.: PCT/JP2021/010380
§ 371 (c)(1),
(2) Date: Sep. 12, 2022

(87) PCT Pub. No.: WO2021/187419
PCT Pub. Date: Sep. 23, 2021

(65) Prior Publication Data
US 2023/0094486 A1 Mar. 30, 2023

(30) Foreign Application Priority Data
Mar. 19, 2020 (JP) .................................. 2020-049528

(51) Int. Cl.
*B25B 1/24* (2006.01)
*B23B 31/16* (2006.01)
(Continued)

(52) U.S. Cl.
CPC ...... *B25B 1/2452* (2013.01); *B23B 31/16275* (2013.01); *B23G 3/06* (2013.01);
(Continued)

(58) Field of Classification Search
CPC .... B25B 1/02; B25B 1/06; B25B 1/18; B25B 1/2405; B25B 1/2415; B25B 1/2421;
(Continued)

(56) References Cited

U.S. PATENT DOCUMENTS 211,993 A * 2/1879 Hall ...................... B25B 1/2452
269/272
1,499,989 A * 7/1924 Lehmann .............. B25B 1/2421
269/254 R
(Continued)

FOREIGN PATENT DOCUMENTS

CN 101132885 A 2/2008
CN 201783936 U 4/2011
(Continued)

OTHER PUBLICATIONS

Translation of CN 106863160 A (Year: 2017).*
(Continued)

*Primary Examiner* — Tom Rodgers
*Assistant Examiner* — Steven Huang
(74) *Attorney, Agent, or Firm* — Robert P. Michal, Esq.; Carter, DeLuca & Farrell LLP (57) ABSTRACT

Provided is a support device that supports an object to be supported, in a manner that allows the object to rotate, without rotation of the support device itself. The support device is provided with: a base part; pair of support members that are slidably provided with respect to the base part, and have arc-shaped cut-out portions which sandwich and hold a circumferential surface of an object to be supported, from both sides of the object; a plurality of first biasing members that bias the pair of support members in a direction toward each other; a plurality of bearing parts that are provided along the cut-out portions, and are for sandwiching and holding the object to be supported, in a manner that allows the object to rotate; and a plurality of second biasing members that bias the plurality of bearing parts in a direction toward the object to be supported. The plurality of first biasing members bias the pair of support members.

8 Claims, 11 Drawing Sheets

(51) Int. Cl.
*B23G 3/06* (2006.01)
*B23Q 3/06* (2006.01)
*B25B 1/20* (2006.01)
*B25B 5/00* (2006.01)
*B25J 15/08* (2006.01)

(52) U.S. Cl.
CPC .............. *B25B 1/20* (2013.01); *B25B 1/2421* (2013.01); *B25B 5/003* (2013.01); *B25J 15/08* (2013.01)

(58) Field of Classification Search
CPC ....... B25B 1/2478; B25B 1/2452; B25B 1/20; B25B 5/003; B25B 5/02; Y10T 279/1986; Y10T 279/19
USPC .... 269/9, 86, 88, 216, 224, 254 R, 265, 266
See application file for complete search history.

(56) References Cited

U.S. PATENT DOCUMENTS

| | | | | |
|---|---|---|---|---|
| 2,373,384 A | * | 4/1945 | Cross | B25B 1/2473 269/229 |
| 2,569,239 A | * | 9/1951 | Holmen | B25B 1/08 269/162 |
| 2,724,296 A | * | 11/1955 | Parrish | B25B 1/2426 269/251 |
| 2,887,918 A | * | 5/1959 | Benson | B25B 1/2405 269/270 |
| 3,063,708 A | * | 11/1962 | Wollenhaupt | B25B 1/24 425/451.2 |
| 4,353,537 A | * | 10/1982 | Koufos | B25B 1/241 294/902 |
| 4,530,507 A | * | 7/1985 | Lee, Jr. | B23Q 11/0032 279/151 |
| 5,347,897 A | * | 9/1994 | Rouleau | B25B 5/147 82/127 |
| 7,004,067 B1 | * | 2/2006 | Godsey | B41F 17/001 269/170 |
| 9,682,452 B2 | * | 6/2017 | Ueda | B23Q 1/763 |
| 2011/0203420 A1 | | 8/2011 | Riestra | |

FOREIGN PATENT DOCUMENTS

| | | | | |
|---|---|---|---|---|
| CN | 205032937 U | | 2/2016 | |
| CN | 106002776 A | | 10/2016 | |
| CN | 106863160 A | * | 6/2017 | ............... B25B 1/02 |
| CN | 110560717 A | | 12/2019 | |
| CN | 111113131 A | * | 5/2020 | ............... B23Q 1/70 |
| EP | 0102084 A2 | * | 3/1984 | |
| GB | 2290740 A | * | 1/1996 | ........... B25B 1/2415 |
| JP | 861159305 A | | 7/1986 | |
| JP | H0432866 U | | 3/1992 | |
| JP | H0553886 U | | 7/1993 | |
| JP | H0615959 U | | 3/1994 | |
| JP | 2005169512 A | * | 6/2005 | |
| JP | 2017080875 A | | 5/2017 | |
| JP | 2019173861 A | | 10/2019 | |
| WO | 2013005330 A1 | | 1/2013 | |

OTHER PUBLICATIONS

Translation of CN 111113131 A (Year: 2020).*
Translation of JP 2005169512 A (Year: 2005).*
International Search Report issued by the Japanese Patent Office acting as the International Searching Authority in relation to International Application No. PCT/JP2021/010380 dated May 11, 2021 (3 pages) along with English language translation (3 pages).
Written Opinion of the International Searching Authority issued by the Japanese Patent Office acting as the International Searching Authority in relation to International Application No. PCT/JP2021/010380 dated May 11, 2021 (3 pages).
Chinese Office Action including Search Report for application No. 202180021451.1 dated Jan. 20, 2025, no translation available, 7 pages total.

* cited by examiner

SUPPORT DEVICE

CROSS-REFERENCE TO RELATED APPLICATIONS

This application is a national phase entry under 35 U.S.C. 371 of PCT International Application No. PCT/JP2021/010380, filed Mar. 15, 2021, which claims priority to Japanese Patent Application No. 2020-049528, filed Mar. 19, 2020.

TECHNICAL FIELD

The present invention relates to a support device for supporting a support object having a circumferential surface.

BACKGROUND ART

A support device, such as an air chuck, provided for supporting a support object is generally well known. Further, a rotary joint for rotating a support object and a support device that is supporting the support object is also generally well known. An example thereof is disclosed, for example, in JP H05-053886 U.

SUMMARY OF THE INVENTION

As described in JP H05-053886 U as a premise, a general support device rotates together with a support object when the support object is rotated by a rotary joint. Such a support device has not been able to meet a demand for rotating only the support object without rotating the support device, for example, in a situation where a space is limited.

Therefore, an object of the present invention is to provide a support device that rotatably supports a support object without rotating itself.

According to an aspect of the present invention, provided is a support device that supports a support object including a circumferential surface, the support device including: a base portion; a pair of support members provided slidably with respect to the base portion, and provided with cutout portions having an arc shape and configured to hold the circumferential surface from both sides; a plurality of first biasing members configured to bias the pair of support members in directions in which the support members approach each other; a plurality of bearing portions provided along the cutout portions of the pair of support members, and configured to hold the support object in a manner so that the support object is rotatable about an axis of the support object; and a plurality of second biasing members configured to bias the plurality of bearing portions toward the support object in order for the plurality of bearing portions to hold the support object, wherein a biasing force of the plurality of first biasing members and a biasing force of the plurality of second biasing members are set in a manner so that the support object is allowed to be held by the plurality of bearing portions with a force greater than the biasing force applied to the pair of support members by the plurality of first biasing members.

According to the present invention, the support device that rotatably supports the support object without rotating itself is provided.

DESCRIPTION OF THE INVENTION

A preferred embodiment of a support device of the present invention will be described in detail below with reference to the accompanying drawings.

Embodiment

Figure 1:
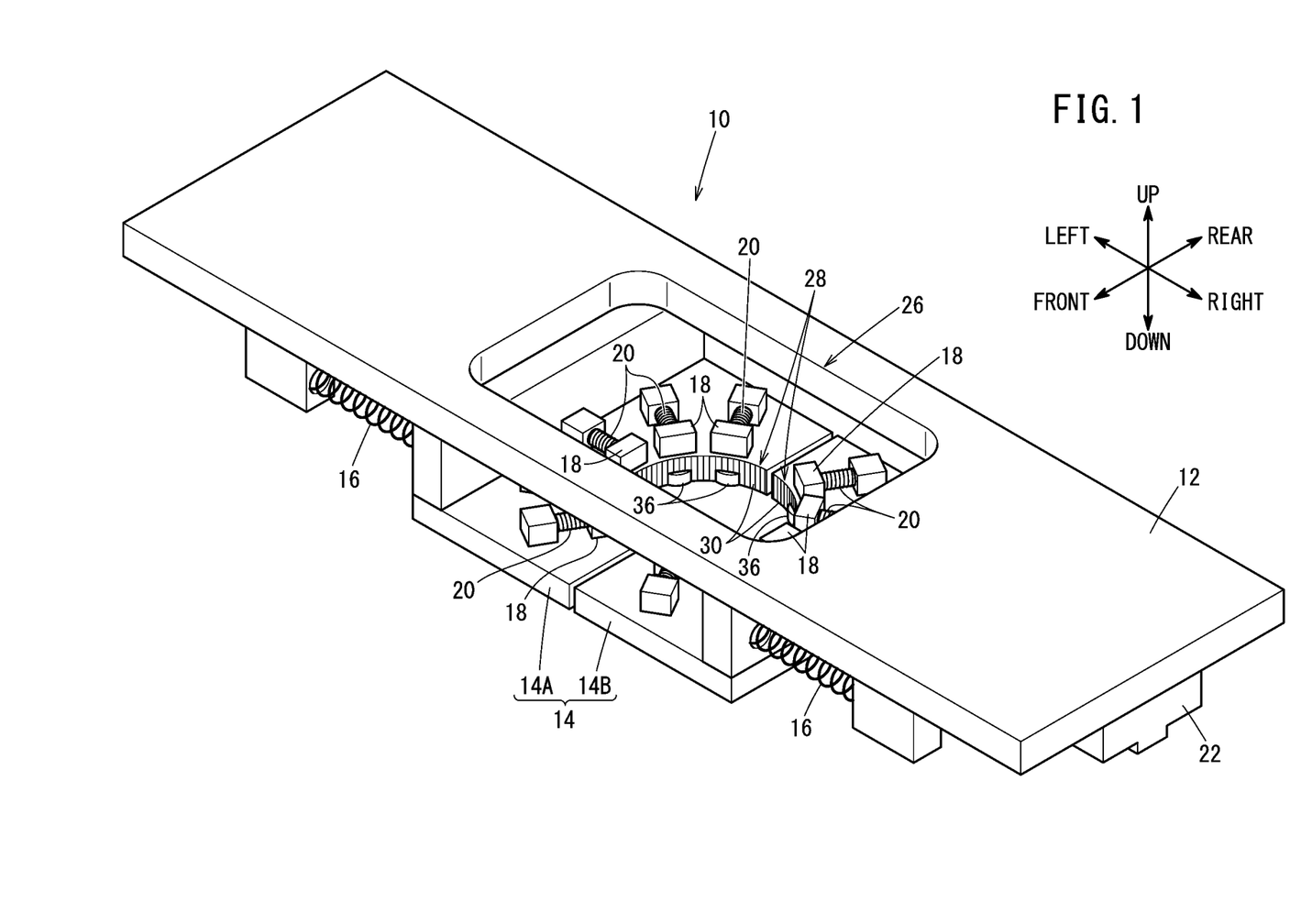
FIG. 1 is a perspective view of a support device according to an embodiment of the present invention.
Figure 2:
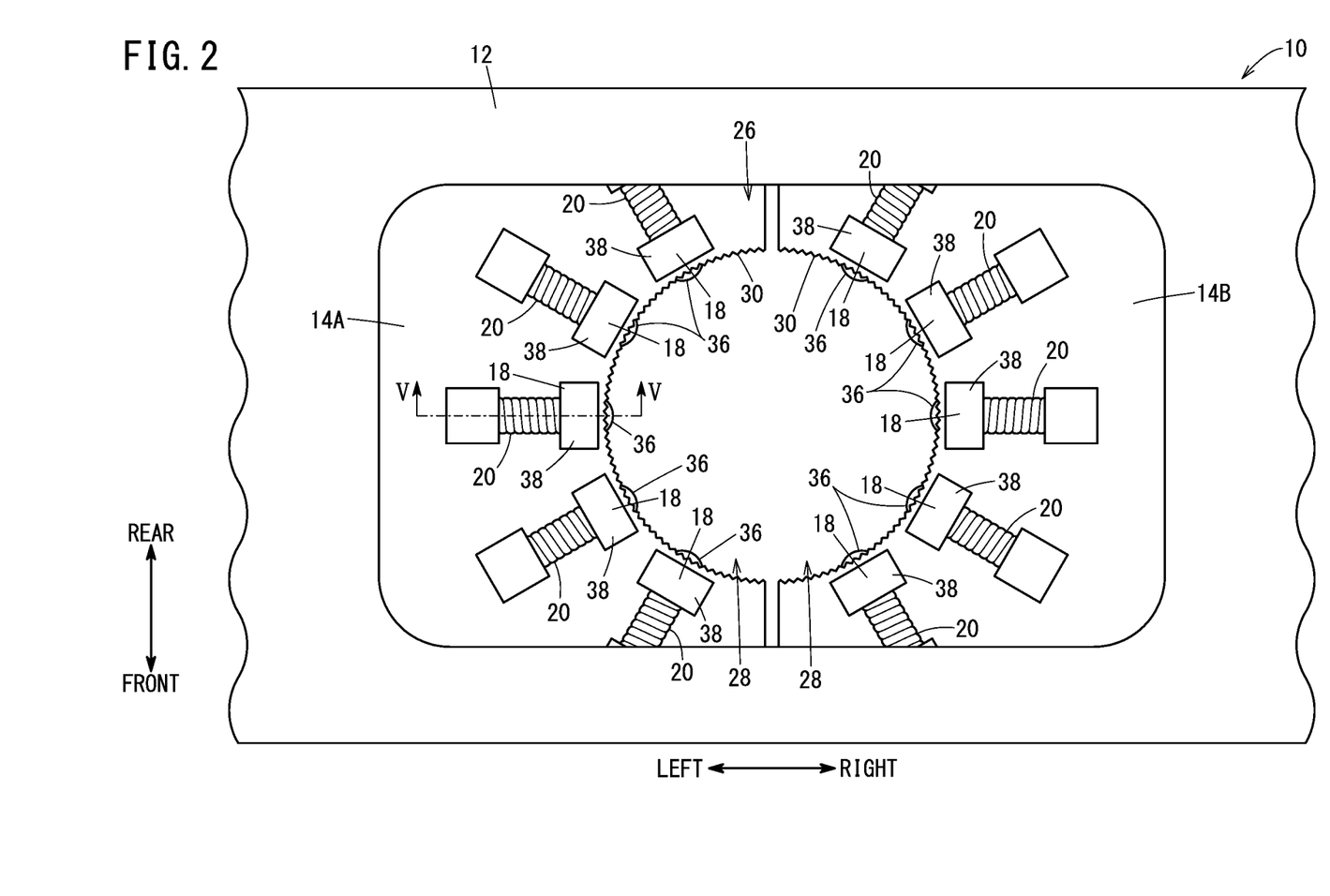
FIG. 2 is a top view of the support device according to the embodiment.
Figure 3:
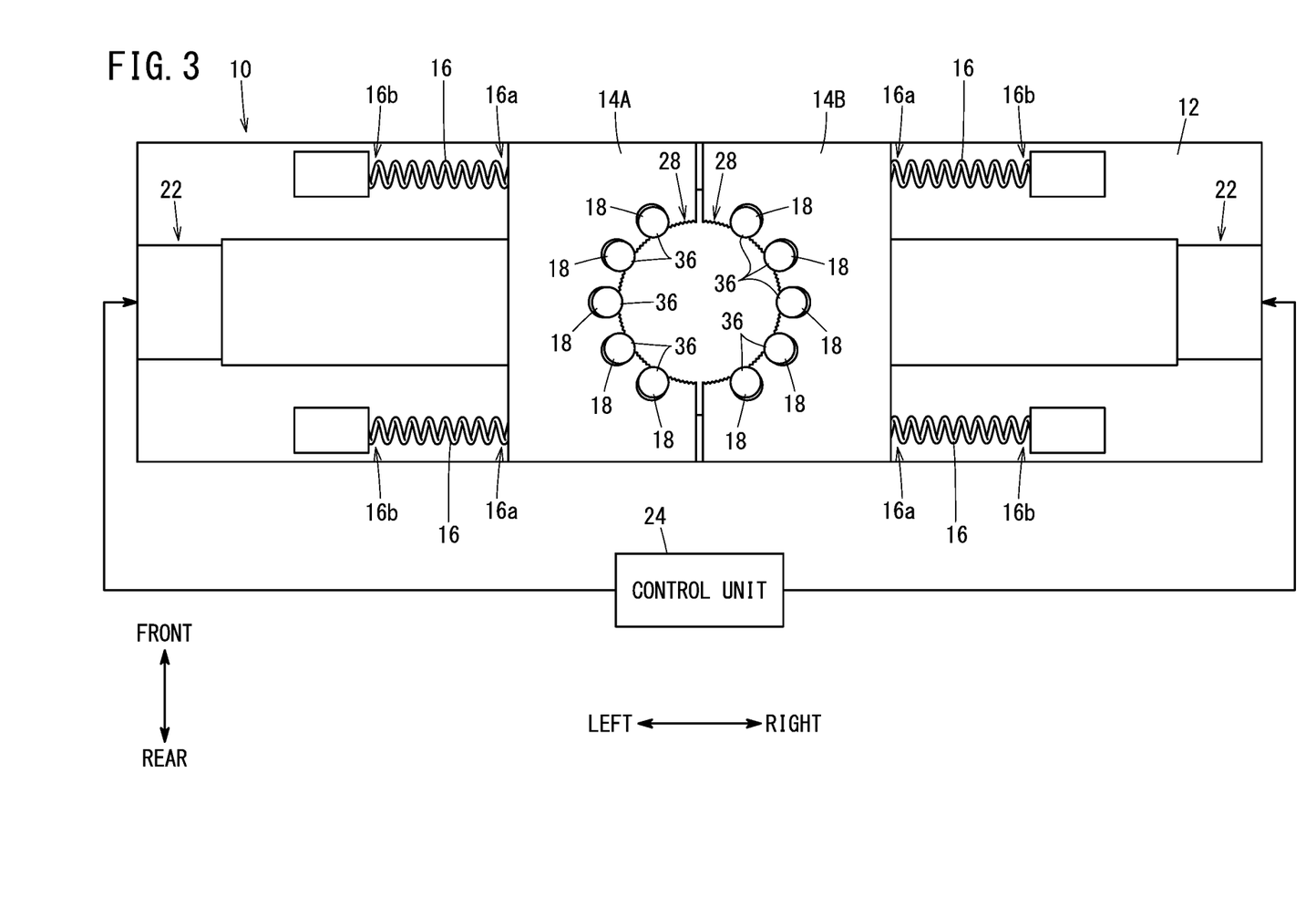
FIG. 3 is a bottom view of the support device according to the embodiment.

FIG. 1 is a perspective view of a support device 10 according to an embodiment of the present invention. FIG. 2 is a top view of the support device 10 according to the embodiment. FIG. 3 is a bottom view of the support device 10 according to the embodiment. The directions of up, down, left, right, front, and rear described below follow the arrows shown in the drawings.

The support device 10 of the present embodiment is a device provided for supporting a support object W (FIG. 4) having a circumferential surface 32. The support device 10 includes a base portion 12, a pair of support members 14, a plurality of first biasing members 16, a plurality of bearing portions 18, a plurality of second biasing members 20, an actuator 22, and a control unit 24. Hereinafter, descriptions will be given concerning such elements.

The base portion 12 is a plate-shaped member and includes metal as a material. Although the base portion 12 illustrated in the present embodiment has a long side in the left-right direction and a short side in the front-rear direction, the base portion 12 is not limited to having a long side and a short side.

A hole (first opening) 26 that penetrates the base portion 12 in the thickness direction (up-down direction) is provided at the center of the base portion 12. The first opening 26 ensures visibility of the support object W held by the pair of support members 14 or by the plurality of bearing portions 18 to be described later, and makes it easy to approach the support object W with a tool T (FIG. 9) or the like.

The pair of support members 14 (14A, 14B) include a left support member 14A and a right support member 14B that face each other in the left-right direction and are configured to be symmetrical to each other. Each of the pair of support members 14 is a substantially flat plate-shaped metal member provided slidably with respect to the base portion 12, and is provided with an arc-shaped cutout portion 28. The cutout portion 28 is provided on a right side surface of the support member 14A that faces the support member 14B, and is provided on a left side surface of the support member 14B that faces the support member 14A. Accordingly, the two cutout portions 28 face each other in the left-right direction.

On the surfaces of the cutout portions 28, a plurality of elongated holes 28s for allowing the bearing portions 18 described later to be slidably provided are formed radially. The arrangement of the plurality of elongated holes 28s provided in the support member 14A and the arrangement of the plurality of elongated holes 28s provided in the support member 14B are symmetrical to each other. Incidentally, instead of the elongated hole 28s, slits may be formed radially in the cutout portions 28.

In addition, it is preferable that an uneven shape 30 along the up-down direction is formed on the surface of each of the cutout portions 28. The reason will be described later.

In the present embodiment, the support object W is a screw member having a circular head. However, the support object W is not limited to the screw member and may be, for example, a simple cylindrical member. In addition, the circumferential surface 32 of the support object W includes not only a circular end surface but also a circular cross section. The support object W has an axis 34 passing through the center of the circumferential surface 32.

The plurality of first biasing members 16 bias the pair of support members 14 in approaching directions. The approaching directions are parallel to a direction in which the pair of support members 14 face each other, and refer to directions in which the pair of support members 14 approach each other. That is, the approaching direction for the support member 14A refers to the right direction toward the support member 14B, and the approaching direction for the support member 14B refers to the left direction toward the support member 14A.

Each of the plurality of first biasing members 16 is a compression coil spring having elasticity in the present embodiment. However, the plurality of first biasing members 16 are not limited to compression coil springs as long as they bias the pair of support members 14.

In the present embodiment, two first biasing members 16 are connected to each of the pair of support members 14. Among these, concerning each of the first biasing members 16 connected to the support member 14A, one end 16a is connected to the support member 14A on the opposite side to the support member 14B, and another end 16b is connected to the base portion 12. Similarly, concerning each of the first biasing members 16 connected to the support member 14B, one end 16a is connected to the support member 14B on the opposite side to the support member 14A, and another end 16b is connected to the base portion 12.

As shown in FIG. 3, the two first biasing members 16 connected to the support member 14A are paired with each other in the front-rear direction with respect to the support member 14A. Accordingly, the biasing force applied to the support member 14A from one of the first biasing members 16 connected to the support member 14A becomes equal to the biasing force applied to the support member 14A from the other first biasing member 16.

Similarly, the two first biasing members 16 connected to the support member 14B are paired with each other in the front-rear direction with respect to the support member 14B. Accordingly, the biasing force applied to the support member 14B from one of the first biasing members 16 connected to the support member 14B becomes equal to the biasing force applied to the support member 14B from the other first biasing member 16.

Further, the set of the two first biasing members 16 connected to the support member 14A, and the set of the two first biasing members 16 connected to the support member 14B, are paired with each other in the left-right direction. Accordingly, the biasing force applied to the support member 14A and the biasing force applied to the support member 14B are equalized.

Figure 4:
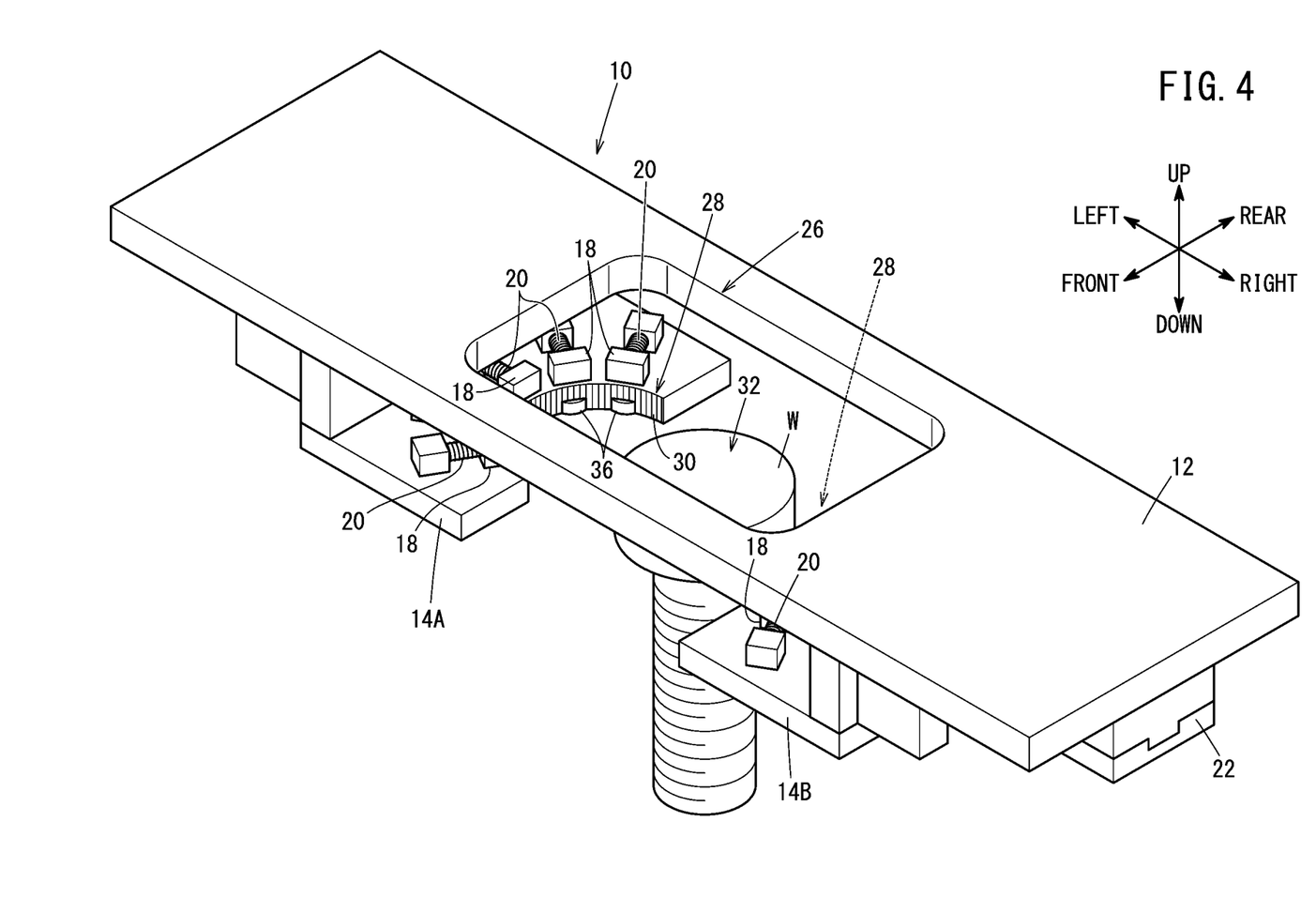
FIG. 4 is a perspective view showing a state in which a support object is disposed between two cutout portions.

FIG. 4 is a perspective view showing a state in which the support object W is disposed between the two cutout portions 28.

The pair of support members 14 can move in separating directions opposite to the approaching directions as shown in FIG. 4 by contracting the plurality of first biasing members 16. The contraction of the plurality of first biasing members 16 can be easily achieved by using the actuator 22 described below.

The support object W having the circumferential surface 32 and the axis 34 passing through the center of the circumferential surface 32 can be disposed between the two cutout portions 28 facing each other. Thus, the support object W is sandwiched from both sides of the circumferential surface 32 by the two cutout portions 28.

Figure 5:
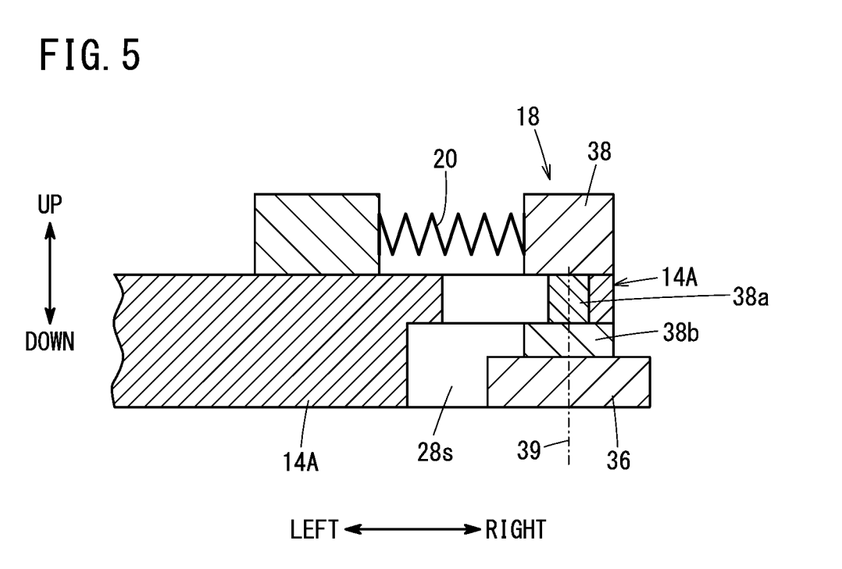
FIG. 5 is a cross-sectional view taken along line V-V in FIG. 2.

FIG. 5 is a cross-sectional view taken along line V-V in FIG. 2.

The plurality of bearing portions 18 are components provided in the plurality of elongated holes 28s of the cutout portions 28. Each of the plurality of bearing portions 18 is provided in one elongated hole 28s. Further, each of the bearing portions 18 includes a rolling body 36 and a support body 38.

Among them, the rolling body 36 itself is, for example, one radial bearing, and is a member having an axis (rotary axis) 39 parallel to the axis 34 (FIG. 6) of the support object W disposed between the two cutout portions 28.

The support body 38 is a member that rotatably supports the rolling body 36. The support body 38 is provided above the elongated hole 28s, and has a width larger than the short side width of the elongated hole 28s (the width in a direction toward and away from the viewer viewing FIG. 5). Therefore, the support body 38 does not fall downward through the elongated hole 28s. The support body 38 and the support member 14 are not fixed to each other. This allows the support body 38 to slide with respect to the support member 14.

In addition, the support body 38 includes an extending portion 38a which is inserted through the elongated hole 28s, and a flange portion 38b which restricts a movable range of the support body 38 in the up-down direction. The flange portion 38b is provided on the lower end side of the extending portion 38a, and comes into contact with the lower surface of the support member 14 from below to restrict the upward movement of the sliding support body 38.

The rolling body 36 is rotatably connected to the lower end of the extending portion 38a. In this regard, for example, when the rolling body 36 is a radial bearing, an inner ring of the radial bearing may be connected to the extending portion 38a. As a result, it is possible to support the radial bearing by the support body 38 while allowing an outer ring of the radial bearing to rotate.

The configuration of the bearing portion 18 is not limited to the above feature. For example, the rolling body 36 may be a so-called roller (cylindrical roller, barrel-shaped roller, or the like). At this time, the roller may be made rotatable by providing, in the extending portion 38a, a bearing structure for rotatably supporting the roller, or the extending portion 38a may be fixed to the roller and a bearing structure for rotatably supporting the extending portion 38a may be provided in the support body 38.

The plurality of second biasing members 20 are members that bias the plurality of bearing portions 18 toward the support object W disposed between the two cutout portions 28. The plurality of second biasing members 20 are each arranged on the support member 14, on an extension in the longitudinal direction of each of the plurality of elongated holes 28s provided radially, and contract along the longitudinal direction. As a result, the bearing portion 18 slides along the longitudinal direction of the elongated hole 28s in accordance with the expansion and contraction of the second biasing member 20.

The biasing force of the plurality of second biasing members 20 is set to be greater than the biasing force applied to the pair of support members 14 by the plurality of first biasing members 16. Each of the plurality of second biasing members 20 is a compression coil spring in the present embodiment, but is not limited to a compression coil spring similarly to the first biasing members 16.

One second biasing member 20 is connected to one bearing portion 18. When the bearing portion 18 is not applied with a compressive force by the second biasing member 20 connected thereto, the rolling body 36 is held in a state in which a part thereof protrudes from the cutout portion 28 (FIG. 3).

The actuator 22 is provided in the base portion 12 and causes the pair of support members 14 to hold the support object W by moving the pair of support members 14 in the approaching directions. In the present embodiment, the actuator 22 is formed of a pair of air cylinders that are driven to apply a linear force in the left-right direction to the pair of support members 14. One of the pair of air cylinders is connected to the support member 14A, and the other air cylinder is connected to the support member 14B.

Note that the actuator 22 is not limited to the pair of air cylinders as long as the actuator 22 moves the pair of support members 14 in the approaching directions. For example, the actuator 22 may be constituted by a hydraulic cylinder, a ball screw mechanism, or an electric motor.

The control unit 24 controls the actuator 22 to switch between holding of the support object W by the pair of support members 14 and holding of the support object W by the plurality of bearing portions 18. This switching will be described later. In the present embodiment, the control unit 24 is a controller for the pair of air cylinders described above.

In the present embodiment, a state in which the movement of the pair of support members 14 is controlled by the actuator 22 is referred to as an "ON state" of the actuator 22. Further, a state in which the above-described movement is not controlled by the actuator 22 is referred to as an "OFF state" of the actuator 22. Since the support device 10 includes the control unit 24, the switching between the ON state and the OFF state can be easily achieved.

The above is the outline of the configuration of the support device 10 according to the present embodiment. Next, a description will be given of switching in the support device 10 between holding of the support object W by the pair of support members 14 and holding of the support object W by the plurality of bearing portions 18.

First, holding of the support object W by the pair of support members 14, which is realized by the support device 10 according to the present embodiment, will be described. This holding is realized by bringing the pair of support members 14 close to each other by bringing the actuator 22 into the ON state from the state shown in FIG. 4.

Figure 6:
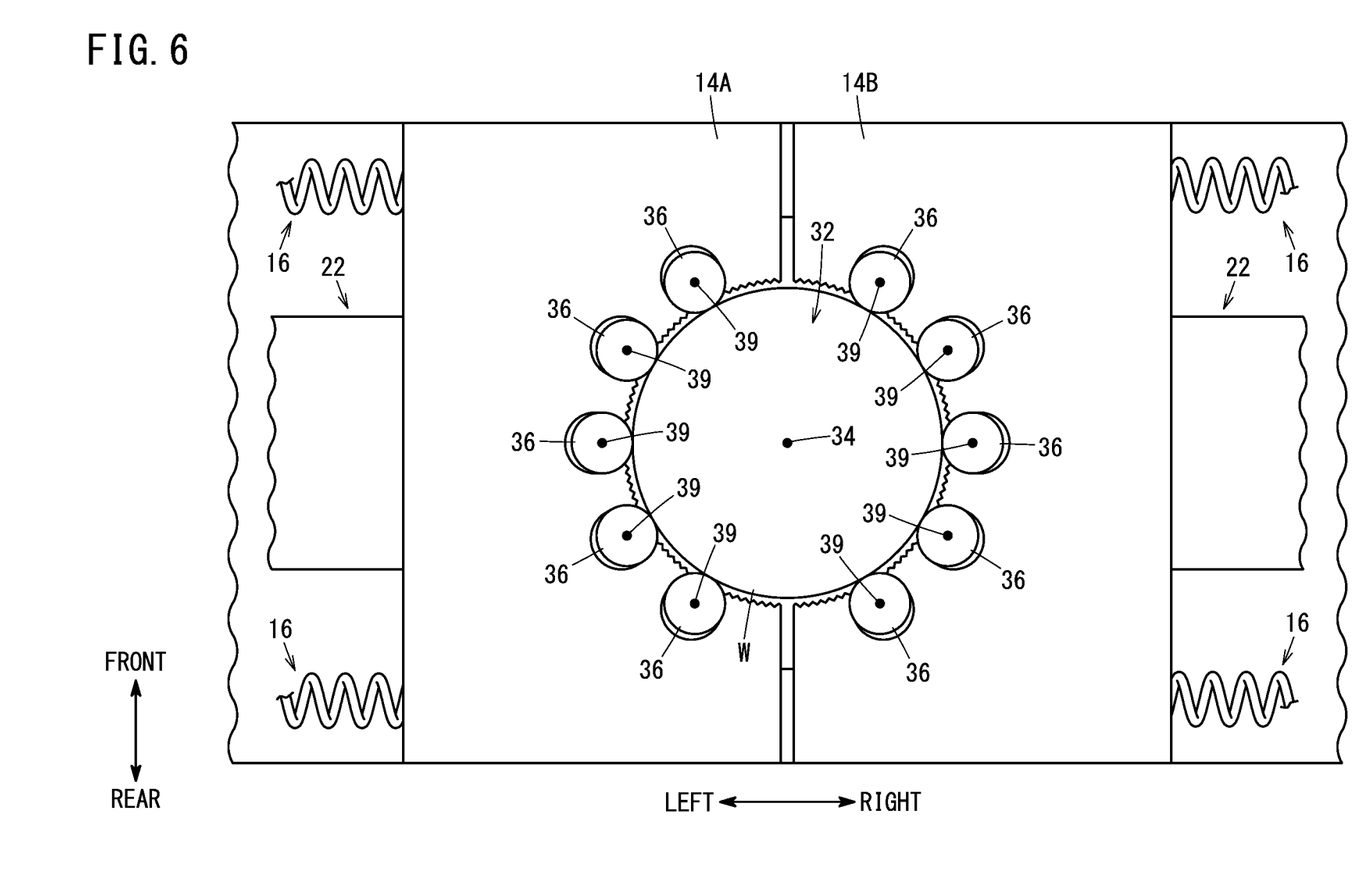
FIG. 6 is a first view for explaining holding of the support object by a pair of support members.

FIG. 6 is a first view for explaining holding of the support object W by the pair of support members 14.

When the pair of support members 14 are moved in the approaching directions, the rolling bodies 36 first come into contact with the support object W. Here, the actuator 22 move each of the pair of support members 14 in the approaching direction with a force greater than the biasing force of the plurality of second biasing members 20 on the support member 14A and the biasing force of the plurality of second biasing members 20 on the support member 14B. As a result, in accordance with the movement, a pressing force is applied to the rolling bodies 36 from the support object W. At this time, the plurality of second biasing members 20 absorb the pressing force by contracting themselves.

Figure 7:
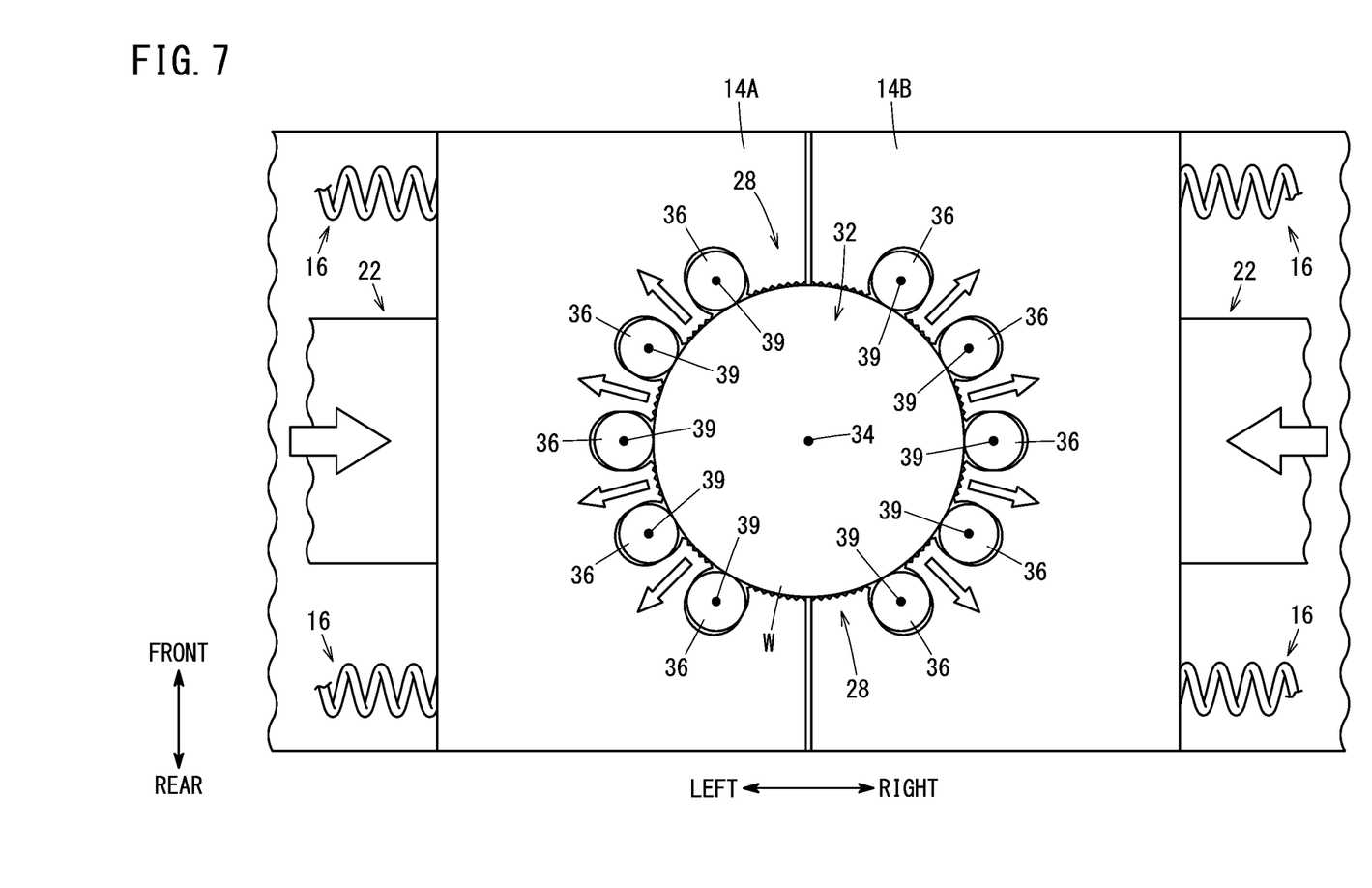
FIG. 7 is a second view for explaining holding of the support object by the pair of support members.

FIG. 7 is a second view for explaining holding of the support object W by the pair of support members 14.

When the plurality of second biasing members 20 contract, the plurality of bearing portions 18 slide away from the support object W. When the actuator 22 further continues to move the pair of support members 14 in the approaching directions, finally, as shown in FIG. 7, the cutout portions 28 of the pair of support members 14 come into contact with the support object W. The holding of the support object W by the pair of support members 14 is realized by maintaining this state.

In the holding state of FIG. 7, the support object W is firmly held from both sides of the circumferential surface 32 by the arc-shaped cutout portions 28 provided in the pair of support members 14, and the support object W is prevented from rotating relative to the support device 10. Therefore, when it is not desired to rotate the support object W, the holding state shown in FIG. 7 is suitable.

Further, at this time, if the uneven shape 30 is formed on the surface of each of the cutout portions 28, the unevenness functions as a slip stopper of the support object W.

Accordingly, it is more favorably achieved that the support object W is held by the pair of support members 14 so as not to rotate.

Figure 8:
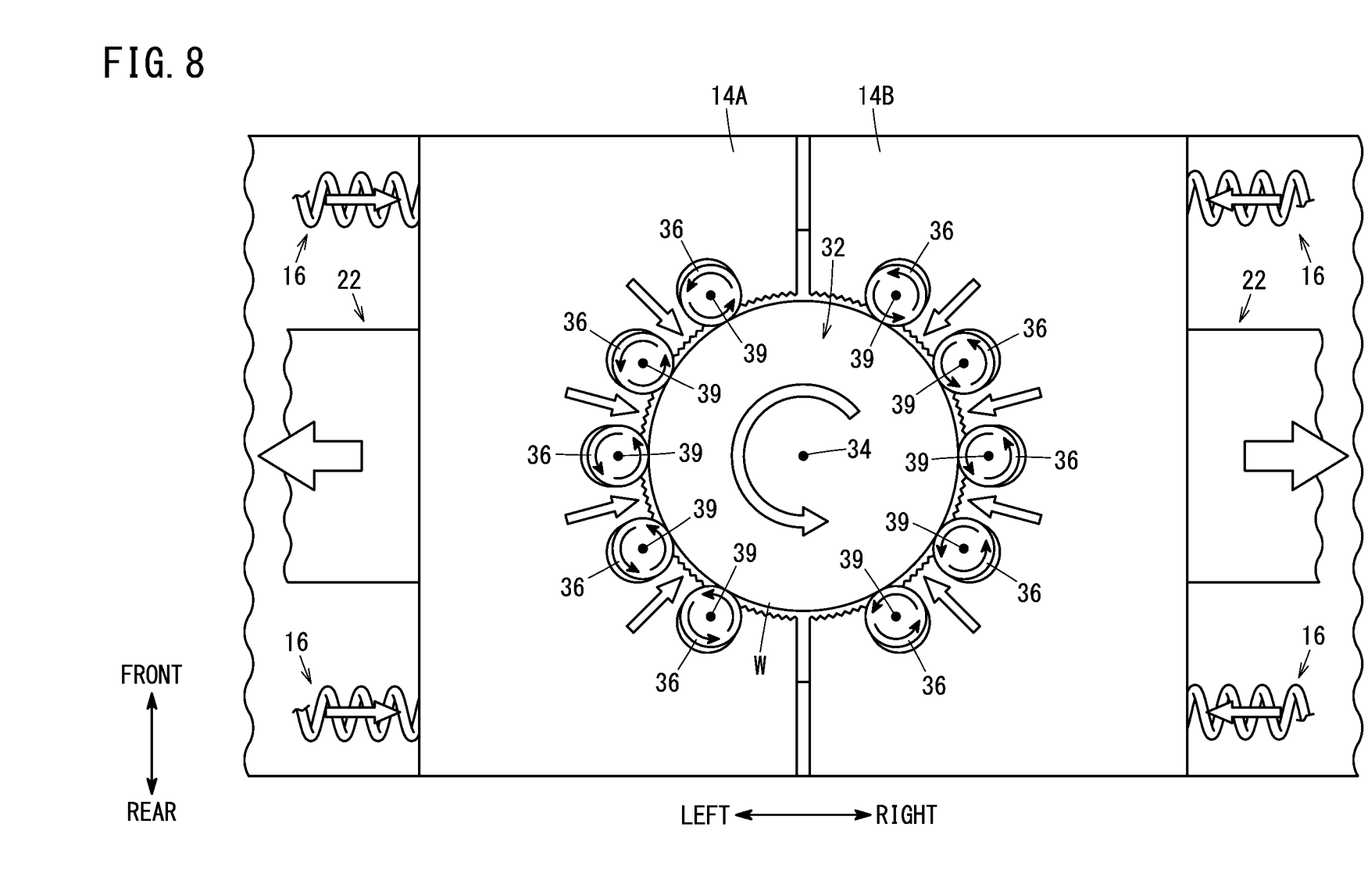
FIG. 8 is a first view for explaining holding of the support object by a plurality of bearing portions.

FIG. 8 is a first view for explaining holding of the support object W by the plurality of bearing portions 18.

Next, holding of the support object W by the plurality of bearing portions 18 will be described. This holding can be realized by bringing the actuator 22 into the OFF state. That is, when the actuator 22 is brought into the OFF state, the pair of support members 14 are biased in the approaching directions by the plurality of first biasing members 16. As a result, in the same manner as when the support members 14 are moved by the actuator 22, the rolling bodies 36 of the plurality of bearing portions 18 provided on the pair of support members 14 first come into contact with the support object W.

Here, as described above, the biasing force of the plurality of second biasing members 20 that push out the plurality of bearing portions 18 toward the support object W is greater than the biasing force applied to the pair of support members 14 by the plurality of first biasing members 16. Therefore, when the actuator 22 is in the OFF state, the plurality of bearing portions 18 are not pushed in as in the case of FIG. 7, and can hold the support object W by the rolling bodies 36 thereof. In this manner, holding of the support object W by the plurality of bearing portions 18 is realized.

Figure 9:
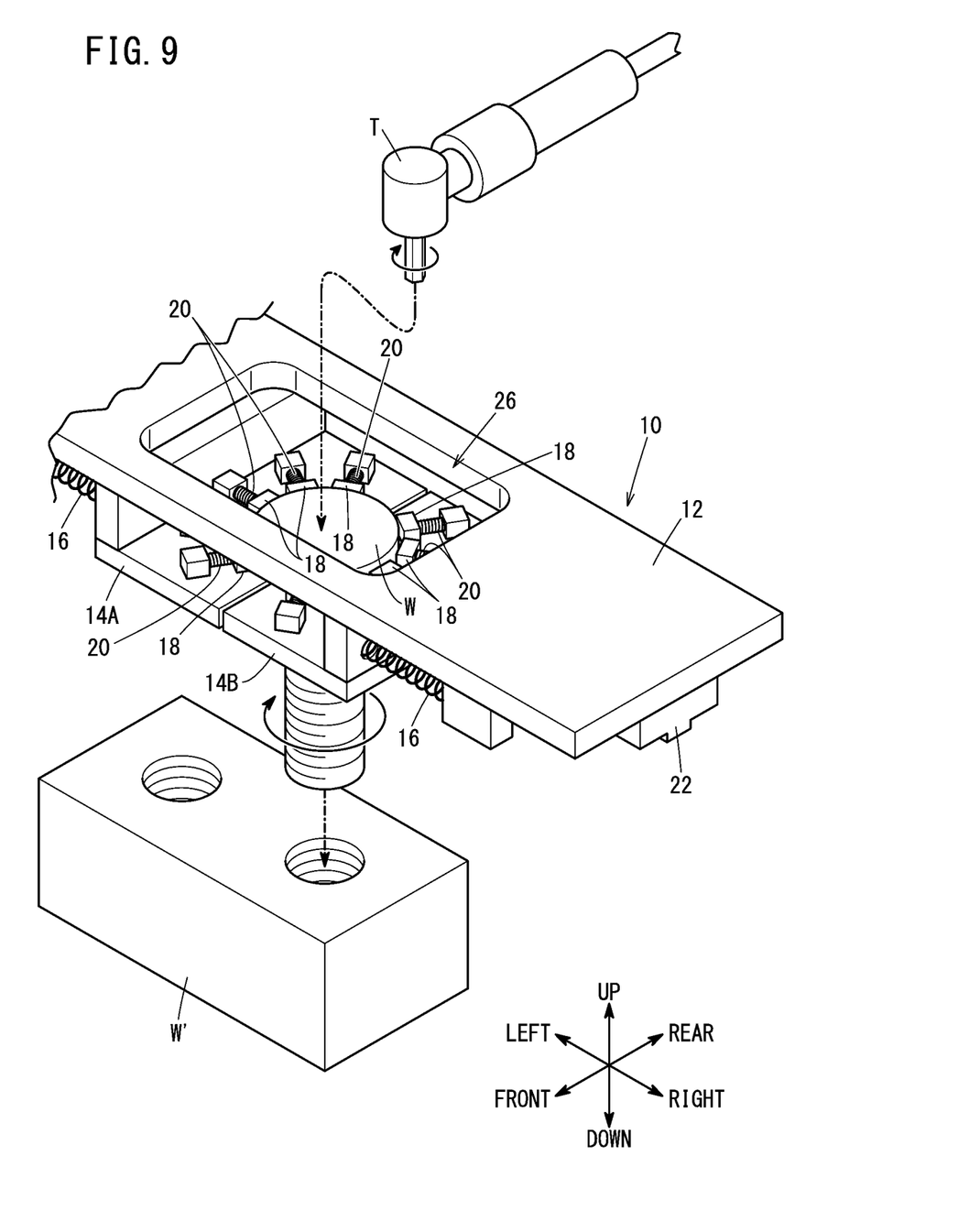
FIG. 9 is a second view for explaining holding of the support object by the plurality of bearing portions.

FIG. 9 is a second view for explaining holding of the support object W by the plurality of bearing portions 18.

In the state shown in FIG. 8, when the support object W rotates about the axis 34, the rolling bides 36 also rotate together about their rotation axes. That is, in the state shown in FIG. 8, it is possible to rotatably support the support object W without rotating the support device 10 as a whole.

As a result, for example, as illustrated in FIG. 9, it is possible to easily perform an operation of fastening a screw member, which is the support object W, to another member W' while rotatably supporting the screw member by the support device 10. At this time, if the first opening 26 is provided in the base portion 12, it is possible to easily access the support object W with the tool T for screw fastening from the base portion 12 side through the first opening 26. Since the support device 10 does not rotate during the fastening operation, fixing at one place can be easily performed, and the fastening operation can be carried out with favorable workability even in a place where the space is limited.

As described above, according to the present embodiment, the support device 10 that rotatably supports the support object W without rotating itself is provided. In addition, according to the configuration of the support device 10 of the present embodiment, it is also possible that the support object W is supported so as not to rotate. Further, according to the configuration of the support device 10 of the present embodiment, the support object W can be selectively supported so as to be rotatable and so as not to rotate.

[Modification]

The embodiment has been described above as one example of the present invention. It goes without saying that various modifications or improvements are capable of being added to the above-described embodiment. Further, it is clear from the scope of the claims that other modes to which such modifications or improvements have been added can be included within the technical scope of the present invention.

(Modification 1)

Hereinafter, a support device 10 according to a first modification will be described. However, a description of elements having the same names and the same reference numerals as those already described in the embodiment will be appropriately omitted.

Figure 10:
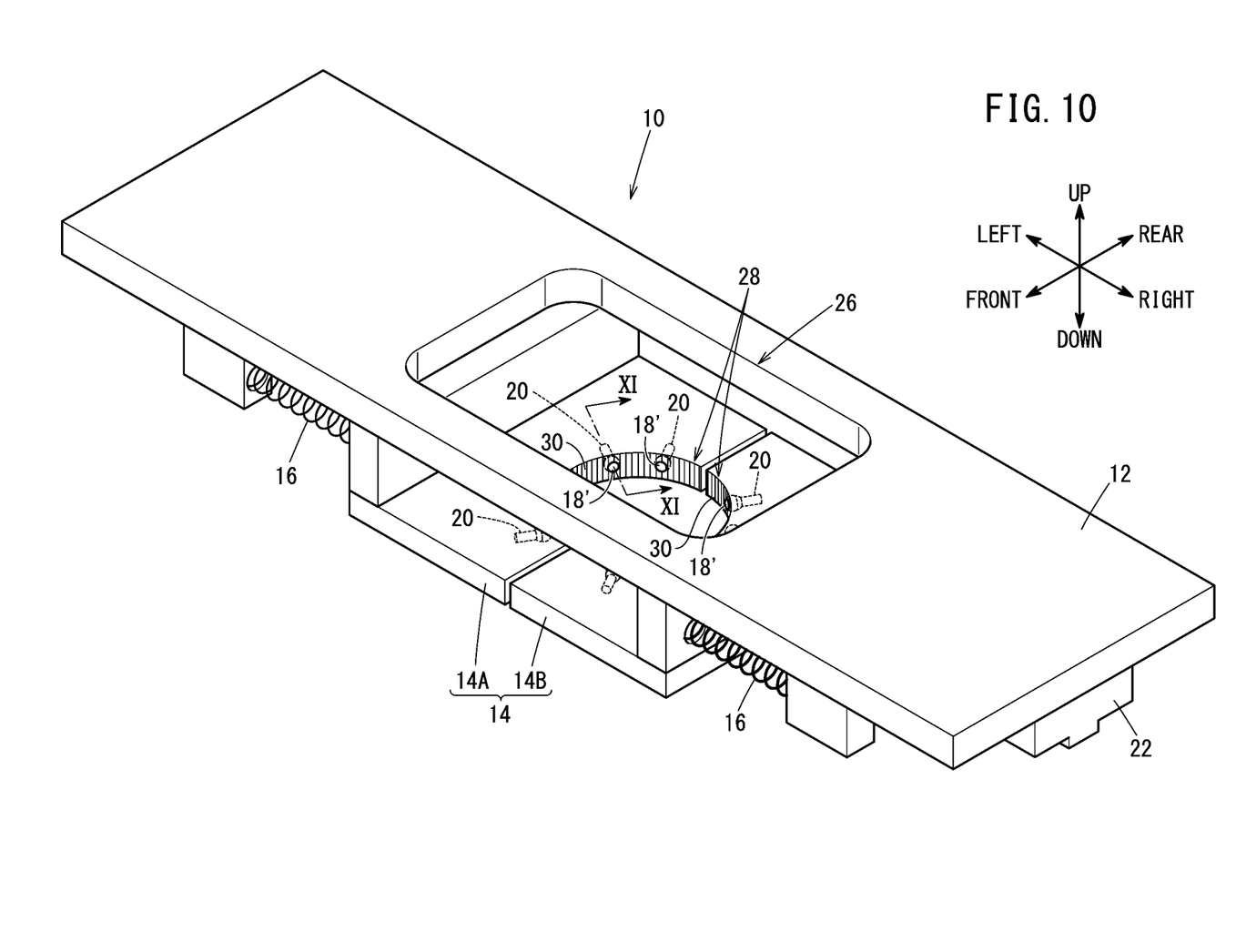
FIG. 10 is a view for explaining a configuration of a support device according to a first modification.
Figure 11:
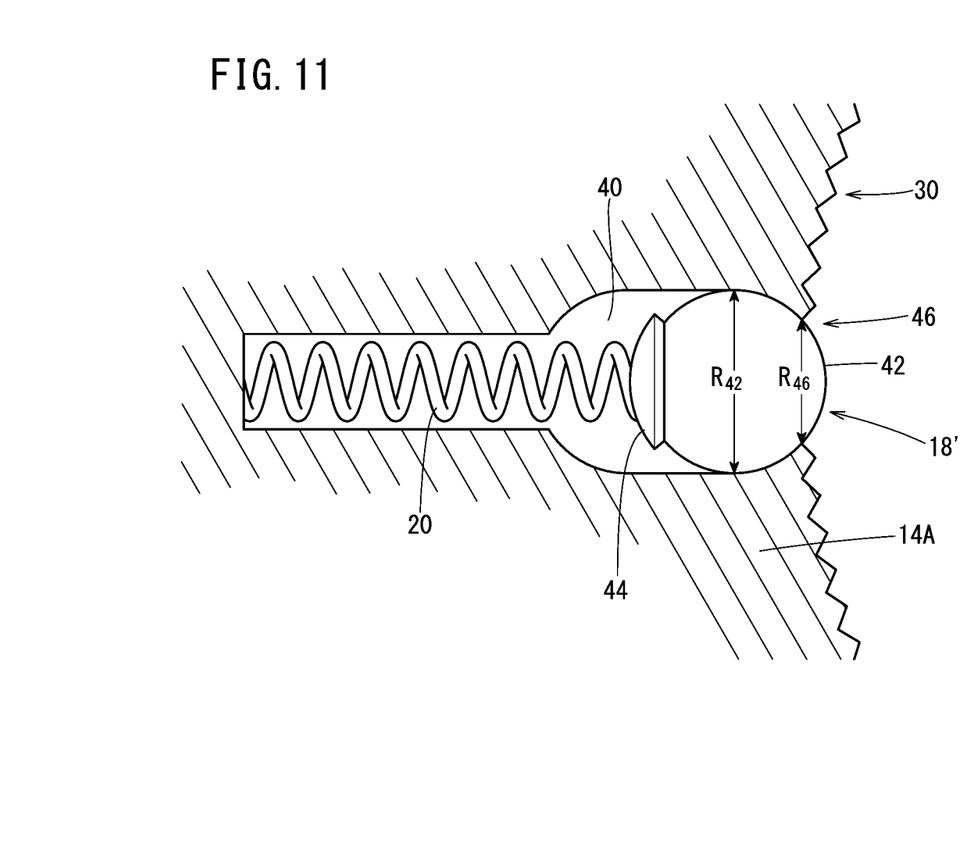
FIG. 11 is a cross-sectional view taken along line XI-XI of FIG. 10.

FIG. 10 is a view for explaining a configuration of the support device 10 according to the first modification. FIG. 11 is a cross-sectional view taken along line XI-XI of FIG. 10.

The configuration of the bearing portions 18 is not limited to that of the embodiment. For example, the bearing portions 18 may each include an accommodation portion 40, a rolling body 42, and a spherical body sliding portion 44. Hereinafter, for the sake of convenience, the bearing portion 18 of the present modification is also referred to as a bearing portion 18'.

The accommodation portion 40 is provided for accommodating the rolling body 42, and is provided with an opening (second opening) 46 facing the support object W sandwiched between the pair of support members 14. The accommodation portions 40 may be a plurality of cavities provided in the pair of support members 14.

It is preferable that an inner surface of the accommodation portion 40 that comes into contact with the accommodated rolling body 42 is smooth so that the rolling body 42 can favorably perform rolling described later.

The rolling body 42 of the present modification is a spherical member having a diameter larger than that of the second opening 46 (R42>R46). The rolling body 42 is accommodated in the accommodation portion 40 as described above. In the present modification, the material of the rolling body 42 includes metal.

The spherical body sliding portion 44 is a member that is connected to the second biasing member 20 in the accommodation portion 40, and biases the rolling body 42 toward the second opening 46 while rollably supporting the rolling body 42. The spherical body sliding portion 44 has a dish-like shape in the present modification.

In addition, it is preferable that a surface of the spherical body sliding portion 44 that comes into contact with the rolling body 42 is smooth similarly to the inner surface of the accommodation portion 40.

The plurality of bearing portions 18' can rotatably hold the support object W. That is, in the configuration of the present modification, the rolling bodies 42 are pressed toward the second openings 46 by the second biasing members 20 via the spherical body sliding portions 44, and the rolling bodies 42 are partially exposed to the outside of the accommodation portions 40 from the second openings 46. As a result, the rolling bodies 42 of the plurality of bearing portions 18' come into contact with the support object W.

Here, when the actuator 22 is in the OFF state, for the same reason as in the embodiment, the support object W is held not by the pair of support members 14 biased by the plurality of first biasing members 16, but by the plurality of rolling bodies 42 biased by the plurality of second biasing members 20.

Since the rolling body 42 itself can roll, the rolling body 42 allows the support object W in contact therewith to rotate. Therefore, also in the present modification, the support device 10 can rotatably support the support object W without rotating itself.

Inventions that can be Obtained from the Embodiment

The inventions that can be grasped from the above-described embodiment and modification will be described below.

Provided is the support device (10) that supports the support object (W) including the circumferential surface (32), the support device (10) including: the base portion (12); the pair of support members (14) provided slidably with respect to the base portion (12), and provided with the cutout portions (28) having an arc shape and configured to hold the circumferential surface (32) from both sides; the plurality of first biasing members (16) configured to bias the pair of support members (14) in directions in which the support members (14) approach each other; the plurality of bearing portions (18) provided along the cutout portions (28) of the pair of support members (14), and configured to hold the support object (W) in a manner so that the support object (W) is rotatable about the axis (34) of the support object (W); and the plurality of second biasing members (20) configured to bias the plurality of bearing portions (18) toward the support object (W) in order for the plurality of bearing portions (18) to hold the support object (W), wherein the biasing force of the plurality of first biasing members (16) and the biasing force of the plurality of second biasing members (20) are set in a manner so that the support object (W) is allowed to be held by the plurality of bearing portions (18) with a force greater than the biasing force applied to the pair of support members (14) by the plurality of first biasing members (16).

Thus, the support device (10) that rotatably supports the support object (W) without rotating itself is provided.

The base portion (12) may be provided with the hole (26) that penetrates the base portion (12) in a thickness direction thereof and faces the support object (W) when the support object (W) is in a state of being held by the pair of support members (14) or by the plurality of bearing portions (18). As a result, it is possible to ensure visibility of the support object (W) and to easily approach the support object (W) with the tool (T) or the like.

The support device (10) may further include the actuator (22) provided on the base portion (12) and configured to cause the pair of support members (14) to hold the support object (W) by moving the pair of support members (14) in the directions in which the support members (14) approach each other. As a result, by bringing the actuator (22) into the ON state, the support object (W) can be supported so as not to rotate.

The support device (10) may further include the control unit (24) configured to switch between holding of the support object (W) by the pair of support members (14) and holding of the support object (W) by the plurality of bearing portions (18) by controlling the actuator (22). As a result, it is possible to easily switch between a state in which the support object (W) is supported so as to be rotatable and a state in which the support object (W) is supported so as not to rotate.

The uneven shape (30) may be formed on the surface of each of the cutout portions (28) of the support members (14). As a result, since the uneven shape (30) functions as a slip stopper, it is more favorably achieved that the support object (W) is supported so as not to rotate.

The plurality of bearing portions (18) may include the bearing portion (18) that includes the rolling body (36) including the rotary axis (39) parallel to the axis (34) of the support object (W), and the support body (38) connected to one of the plurality of second biasing members (20) and configured to rotatably support the rolling body (36). As a result, the rolling bodies (36) having the rotary axis (39) parallel to the axis (34) rotatably hold the support object (W).

Each of the plurality of bearing portions (18) may include the bearing portion (18) that includes the accommodation portion (40) provided with the opening (46) facing the support object (W) sandwiched between the pair of support members (14), the rolling body (42) having a spherical shape, accommodated in the accommodation portion (40), and having the diameter ($R_{42}$) larger than that of the opening (46), and the spherical body sliding portion (44) connected to one of the plurality of second biasing members (20), and configured to rollably support the rolling body (42) and bias the rolling body (42) toward the opening (46). As a result, the rolling bodies (42) rolling in the accommodation portions (40) rotatably hold the support object (W).

The invention claimed is:

1. A support device that supports a support object including a circumferential surface, the support device comprising:
    a base portion;
    a pair of support members provided slidably with respect to the base portion, and provided with cutout portions having an arc shape and configured to hold the circumferential surface from both sides;
    a plurality of first elastic bodies configured to bias the pair of support members in directions in which the support members approach each other;
    a plurality of bearing portions provided along the cutout portions of the pair of support members, and configured to hold the support object in a manner so that the support object is rotatable about an axis of the support object; and
    a plurality of second elastic bodies configured to bias the plurality of bearing portions toward the support object in order for the plurality of bearing portions to hold the support object, wherein the support device is configured to switch between a first state and a second state, wherein
    the first state is a state where the circumferential surface and each of the cutout portions of the pair of support members come into contact with each other, whereby the pair of support members supports the support object while relative rotation of the support object relative to the base portion is suppressed, and
    the second state is a state where the circumferential surface and each of the cutout portions of the pair of support members separate from each other and the circumferential surface and the plurality of bearing portions come into contact with each other, whereby the plurality of bearing portions support the support object while the relative rotation is allowed.

2. The support device according to claim 1, wherein the base portion is provided with a hole that penetrates the base portion in a thickness direction thereof and faces the support object.

3. The support device according to claim 1, further comprising
    an actuator provided on the base portion and configured to cause the pair of support members to hold the support object by moving the pair of support members in the directions in which the support members approach each other.

4. The support device according to claim 3, further comprising
    a controller configured to switch between holding of the support object by the pair of support members and holding of the support object by the plurality of bearing portions by controlling the actuator.

5. The support device according to claim 1, wherein
    the cutout portions having the arc shape are arranged in a circumferential direction of the cutout portions and are provided with a plurality of protruding portions that protrude toward the support object.

6. The support device according to claim 1, wherein
    the plurality of bearing portions include a bearing portion that includes:
    a rolling body including a rotary axis parallel to the axis of the support object; and
    a support body connected to one of the plurality of second elastic bodies and configured to rotatably support the rolling body.

7. The support device according to claim 1, wherein
    each of the plurality of bearing portions includes a bearing portion that includes:
    an accommodation portion provided with an opening facing the support object sandwiched between the pair of support members;
    a rolling body having a spherical shape, accommodated in the accommodation portion, and having a diameter larger than that of the opening; and
    a spherical body sliding portion connected to one of the plurality of second elastic bodies, and configured to rollably support the rolling body and bias the rolling body toward the opening.

8. The support device according to claim 1, wherein
    in the first state, the circumferential surface and each of the cutout portions of the pair of support members come into direct contact with each other, and
    in the second state, the circumferential surface and the plurality of bearing portions come into direct contact with each other.

* * * * *